United States Patent
Chen et al.

(10) Patent No.: US 9,511,812 B2
(45) Date of Patent: Dec. 6, 2016

(54) STEERING DRIVING DEVICE FOR SELF-BALANCING TWO WHEELED VEHICLE

(71) Applicant: SHANGHAI NEW CENTURY ROBOT CO., LTD., Shanghai (CN)

(72) Inventors: Yangbin Chen, Shanghai (CN); Lin Shen, Shanghai (CN); Jiyong Fang, Shanghai (CN)

(73) Assignee: Shanghai New Century Robot Co., Ltd., Shanghai (CN)

(*) Notice: Subject to any disclaimer, the term of this patent is extended or adjusted under 35 U.S.C. 154(b) by 147 days.

(21) Appl. No.: 14/424,812

(22) PCT Filed: Jul. 15, 2013

(86) PCT No.: PCT/CN2013/079400
§ 371 (c)(1),
(2) Date: Feb. 27, 2015

(87) PCT Pub. No.: WO2014/032483
PCT Pub. Date: Mar. 6, 2014

(65) Prior Publication Data
US 2015/0239521 A1    Aug. 27, 2015

(30) Foreign Application Priority Data

Aug. 29, 2012  (CN) .......................... 2012 1 0313434

(51) Int. Cl.
| | |
|---|---|
| *B62K 3/00* | (2006.01) |
| *B62K 21/00* | (2006.01) |
| *B62K 21/12* | (2006.01) |
| *B62K 23/06* | (2006.01) |
| *B62K 23/08* | (2006.01) |

(52) U.S. Cl.
CPC ............... *B62K 3/007* (2013.01); *B62K 21/00* (2013.01); *B62K 21/12* (2013.01); *B62K 23/06* (2013.01); *B62K 23/08* (2013.01); *B62K 2202/00* (2013.01)

(58) Field of Classification Search
CPC ...... B62K 3/007; B62K 23/06; B62K 23/08; B62K 21/12; B62K 21/00; B62K 2202/00
See application file for complete search history.

(56) References Cited

FOREIGN PATENT DOCUMENTS

| CN | 201597703 U | 10/2010 |
|---|---|---|
| CN | 201610202 U | 10/2010 |
| CN | 102092438 A | 6/2011 |

(Continued)

*Primary Examiner* — Tony Winner
*Assistant Examiner* — Gabriela C Craciun
(74) *Attorney, Agent, or Firm* — Ladas & Parry LLP

(57) ABSTRACT

A steering driving device for a self-balancing two-wheeled vehicle, the device comprising a first driving mechanism for providing a driving force for a steering system of the self-balancing two-wheeled vehicle by utilizing a first driving manner, a second driving mechanism for providing a driving force for the steering system of the self-balancing two-wheeled vehicle by utilizing a second driving manner, an actuating mechanism fixedly connected to a steering shaft, a transforming mechanism for canceling the coupling of the second driving mechanism and the actuating mechanism when the first driving mechanism is coupled to the actuating mechanism. The steering driving device for the self-balancing two-wheeled vehicle is able to conveniently and reliably switch between the two driving manners, and to ensure the small and compact volume of the two-wheeled vehicle, so that the entertainment of the self-balancing two-wheeled vehicle is enhanced, and an operator would have a good driving experience.

14 Claims, 7 Drawing Sheets

(56) References Cited

FOREIGN PATENT DOCUMENTS

| | | |
|---|---|---|
| CN | 102514663 A | 6/2012 |
| CN | 102795282 A | 11/2012 |
| JP | 2005-094898 A | 4/2005 |
| JP | 2009120177 A | 6/2009 |

STEERING DRIVING DEVICE FOR SELF-BALANCING TWO WHEELED VEHICLE

CROSS-REFERENCE TO RELATED APPLICATION

This U.S. application claims priority under 35 U.S.C 371 to and is a U.S. National Phase application of, the International Patent Application No. PCT/CN2013/079400, filed 15 Jul. 2013, which claims the benefit or prior Chinese Application No. 201210313434.8filed 29 Aug. 2012, The entire contents of the above-mentioned patent applications are incorporated by reference as part of the disclosure of this U.S. application.

FIELD OF THE INVENTION

The present invention relates to a self-balancing two-wheeled vehicle, particularly to a steering driving device of a self-balancing two-wheeled vehicle for providing a driving force for a steering system of the self-balancing two-wheeled vehicle.

BACKGROUND

A self-balancing two-wheeled vehicle is a kind of novel vehicle in which one wheel is on each of the two sides and is independently driven. The self-balancing two-wheeled vehicle employs a precise gyroscope and an acceleration sensor to automatically induce minor changes in the centre of gravity of the body, so as to control the movement and balance, thus achieving the aim of steering in situ and advance. As a new light vehicle, the self-balancing two-wheeled vehicle gradually becomes a light passenger tool used in the places of such as entertainments, squares and sceneries, or the like.

Usually, the steering of a self-balancing two-wheeled vehicle is achieved by applying a driving force by means of the handles operated by the operator's hands.

The authorized Chinese Patent for Utility Model No. CN201597703U discloses a steering constitution of a self-balancing two wheeled vehicle comprising a base plate fixed in the middle of the vehicle body to fix the connected horizontal steering shaft by a support frame and the base plate, in which an operating rod is fixedly connected to one end of the horizontal steering shaft and a potentiometer is arranged at the other end, and on the horizontal steering shaft is fixed a bearing bracket, which is symmetry along the axis, and perpendicular to the operating rod, and an elastomer is arranged below or above both sides of the bearing bracket. In use, the operator can control the rotation of the horizontal steering shaft along the axis direction by swing the operating rod side-to-side with his hands, and the size of the rotation angle of the horizontal steering shaft may be transformed into an instruction by the potentiometer, thus controlling the steering and speed output of the motor, and achieving the purpose of controlling the steering of the two wheeled vehicle.

The authorized Chinese Patent for Utility Model No. CN201610202U discloses an electrically driven and self-balancing two wheeled vehicle, in which the steering mechanism comprises a direction control handle and a steering controller, the steering controller is provided at the bottom of the body support element, and the operator controls the direction by swinging side to side with the steering controller as the rotating shaft.

In addition to the application of the driving force to the steering shaft of the steering system by the operator's hands, the steering system may also apply a driving force to the steering shaft by a foot-controlled handle to increase the entertainment and the driver's experience. The driver may apply a driving force by contacting the foot-controlled handle side to side with his legs, the steering shaft rotates after receiving the driving force. The rotation angle is transmitted to the steering control system by an angle sensor such as Hall device, thus achieving the steering of a self-balancing two wheeled vehicle.

SUMMARY OF THE INVENTION

The object of the invention is to provide a steering driving device for a self-balancing two wheeled vehicle, the steering driving device may achieve the switch between the two driving manners, to provide the steering system for a self-balancing two wheeled vehicle with a driving force optionally in different driving manners.

A steering driving device of the invention is used to provide the steering system for a self-balancing two wheeled vehicle with a driving force, which may be applied to a steering shaft of the steering system and drives the steering shaft to rotate, so that the self-balancing two wheeled vehicle performs a steering action, the steering driving device comprising:

a first driving mechanism for providing a driving force for a steering system of the self-balancing two wheeled vehicle by utilizing a first driving manner;

a second driving mechanism for providing a driving force for the steering system of the self-balancing two wheeled vehicle by utilizing a second driving manner;

an actuating mechanism fixedly connected to a steering shaft of the steering system, when the first driving manner is utilized, the first driving mechanism is coupled with the actuating mechanism, and provides a driving force for the steering shaft by means of the actuating mechanism, and when the second driving manner is utilized, the second driving mechanism is coupled with the actuating mechanism, and provides a driving force for the steering shaft by means of the actuating mechanism; and a transforming mechanism for canceling the coupling of the second driving mechanism and the actuating mechanism when the first driving mechanism is coupled to the actuating mechanism, and for recovering the coupling of the second driving mechanism and the actuating mechanism when the first driving mechanism is discoupled to the actuating mechanism.

Preferably, the first driving mechanism comprises an acting end for coupling with the actuating mechanism.

The second driving mechanism comprises a driving base which will coaxially rotate with the actuating mechanism when coupled with the actuating mechanism, and the second driving mechanism provides a driving force for the steering shaft by means of the driving base and the actuating mechanism.

The actuating mechanism comprises a housing groove and a transforming hole, the housing groove is provided with a fixing component interacting with the acting end of the first driving mechanism at the circumference, for the first driving mechanism to provide a driving force for the actuating mechanism through the fixing effect of the fixing component when the acting end is inserted into the housing groove.

The transforming mechanism comprises a transforming pin. When the acting end of the first driving mechanism isn't inserted into the housing groove of the actuating mechanism, the transforming pin is inserted into the transforming hole of the actuating mechanism, so that the second driving mechanism is coupled with the actuating mechanism via the driving base. When the acting end of the first driving mechanism is inserted into the housing groove of the actuating mechanism, the acting end drives the transforming pin to detach from the transforming hole, so that the second driving mechanism is discoupled with the actuating mechanism.

Preferably, multiple keyways are provided at the acting end of the first driving mechanism, and the fixing component of the housing groove is a key-tooth engaged with the multiple keyways. Moreover, a chamfer is further provided at the acting end to drive the transforming pin to detach from the transforming hole.

Preferably, the acting end is provided with a mating assembly for engaging with the housing groove, and the housing groove is provided with a mating hole for engaging with the mating assembly. The mating assembly comprises a button, a buckle and a buckle elastic component. The buckle comprises a first buckle end and a second buckle end, and the first buckle end contacts with the button, the second buckle end connects with the buckle elastic component, and is provided with a buckle projection for mating with the mating hole under the effect of the buckle elastic component.

Preferably, the transforming pin is provided with a transforming projection for being inserted into the transforming hole. Preferably, the transforming pin is also provided with a stopper projection, and the actuating mechanism is provided with a stopper rotating groove for housing the stopper projection, and the stopper rotating groove is communicated, with the housing groove.

Preferably, the transforming mechanism is also provided with a sensitive switch, which can be activated by the transforming pin.

Preferably, it is characterized in that the first driving mechanism is a manual-controlled handle, and the first driving manner is a manual-driven manner. The second driving mechanism is a foot-controlled handle, and the second driving manner is a leg-driven manner.

The steering driving device for a self-balancing two wheeled vehicle of the invention can provide a driving force for the steering system of a self-balancing two wheeled vehicle by utilizing two different driving manners, which comprises a first driving mechanism and a second driving mechanism, and can conveniently and reliably switch between the two driving manners by utilizing the transforming mechanism and the actuating mechanism, and at the same time, can ensure the small and compact volume of the self-balancing two wheeled vehicle, so that the entertainment of the self-balancing two wheeled vehicle is enhanced, and an operator would have a good driving experience.

DETAILED DESCRIPTION OF PREFERRED EMBODIMENTS

Following, the structure and work principle of the steering driving device of the self-balancing two wheeled vehicle of the invention is described in detail in combination with the drawings and particular embodiments, in which the conventional components or means are only briefly described or omitted, to make the substantive features more prominent.

Generally, the steering driving system for a self-balancing two wheeled vehicle is used for providing a driving force for the steering system of a self-balancing two wheeled vehicle, the steering system comprises a steering shaft, a angle sensor for detecting and transmitting the rotating angle of the steering shaft, and a steering control system for receiving the rotating angle signal and controlling the steering of the self-balancing two wheeled vehicle depending on the signal. The steering driving device of the self-balancing two wheeled vehicle may apply a driving force to the steering shaft of a steering system by different driving means, and drive the steering shaft to rotate, thus making the self-balancing two wheeled vehicle perform the action of steering, Moreover, the steering driving device can conveniently and reliably achieve the switch between different driving means.

Figure 1:
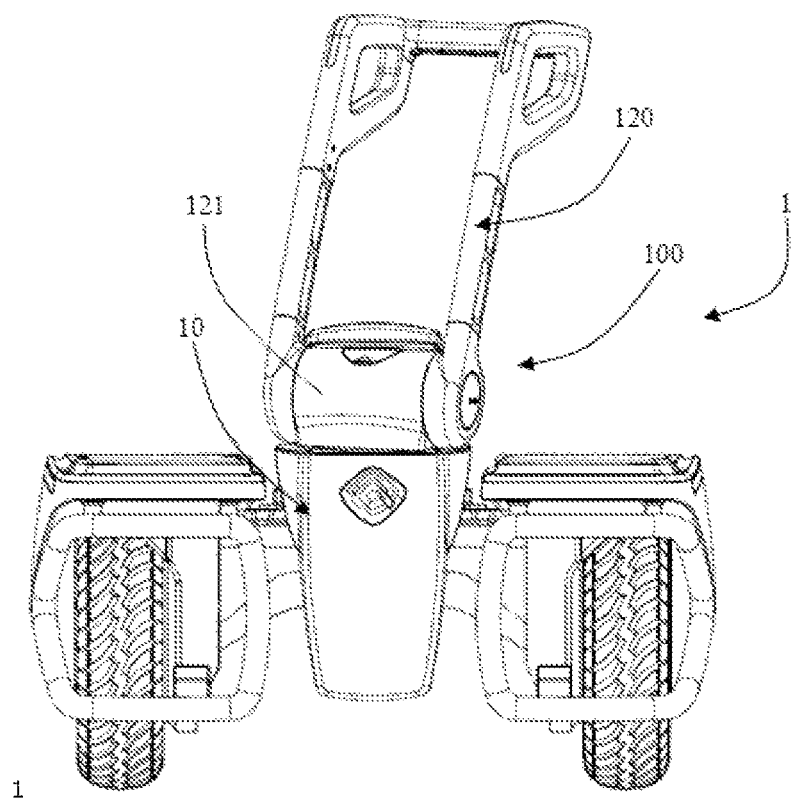
FIG. 1 is a schematic status view of a self-balancing two wheeled vehicle under the state of a steering driving manner.
Figure 2:
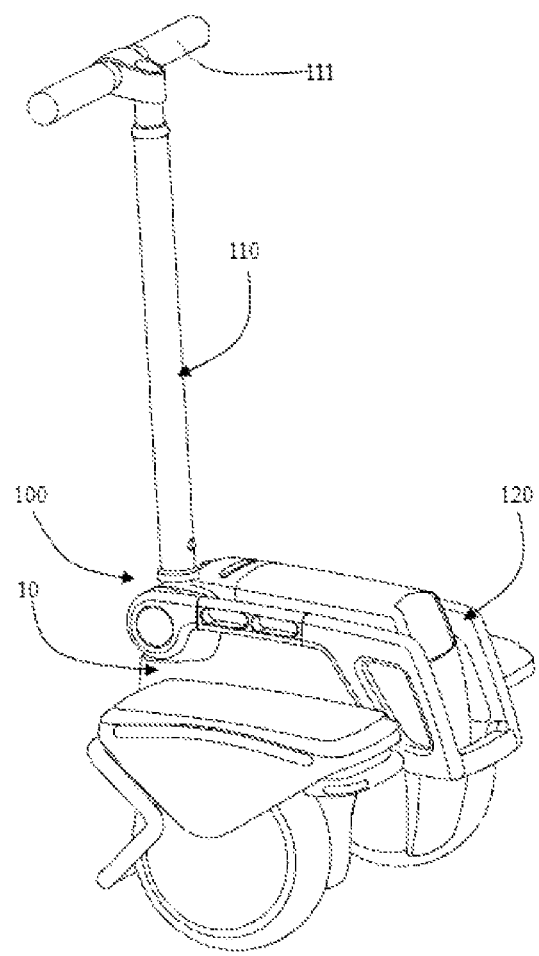
FIG. 2 is a schematic status view of a self-balancing two wheeled vehicle under the state of another steering driving manner.
Figure 3:
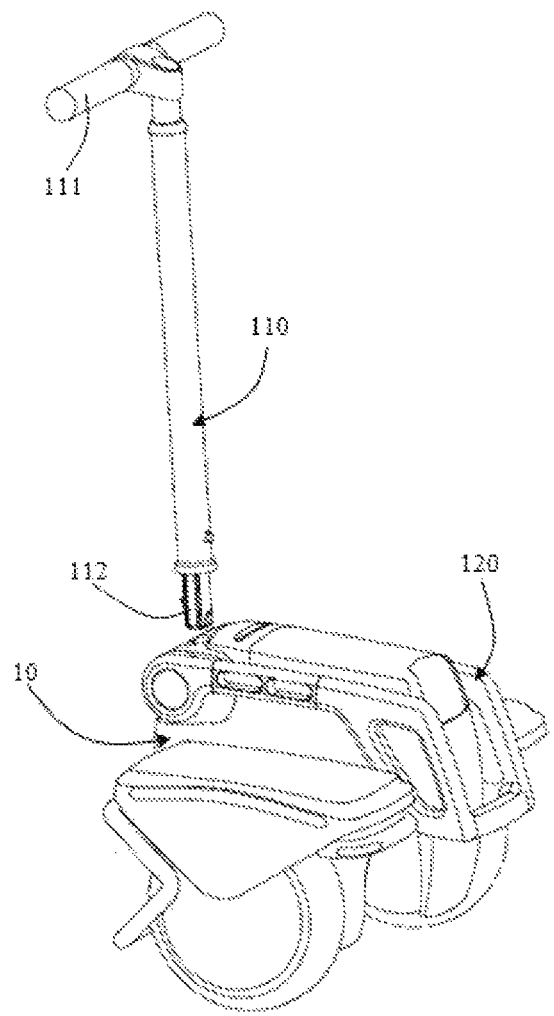
FIG. 3 is a schematic status view of the separation state of a first driving mechanism from the body of a self-balancing two wheeled vehicle.
Figure 10:
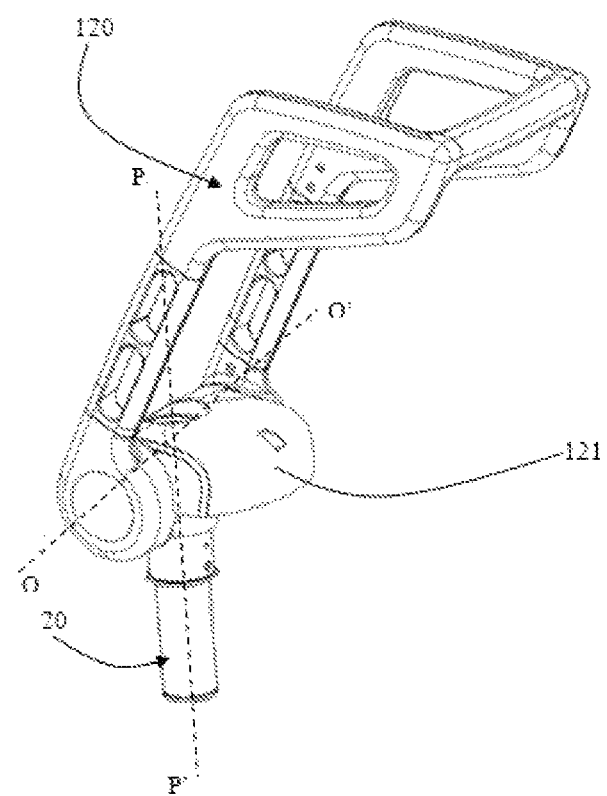
FIG. 10 is a stereogram view showing the details of the second driving mechanism of the invention.

In particular, combined with FIGS. 1, 2 and 3, the steering driving device 100 comprises a first driving mechanism 110, which is used for providing a driving force for a self-balancing two wheeled vehicle 1 by utilizing a first driving means. As shown in the figures, in the illustrated embodiment, the first driving mechanism 110 is a manual-controlled handle capable of being separated from the body of the self-balancing two wheeled vehicle 10. The manual-controlled handle 110 comprises a knob 111 for performing a steering operation by an operator with his hands. It is readily understood that the corresponding first driving means is a manual-controlled, driving means here, that is, the operator provides a driving force for the steering drive by rotating the knob 111 with hands. Continuously combined with FIGS. 1-3, the steering driving device 100 further comprises a second driving mechanism 120 for providing a driving force for a self-balancing two wheeled vehicle 1 by utilizing the second driving means. In the illustrated embodiment, the second driving mechanism 120 is a foldable foot-controlled handle which can be opened or packed up in the body of the self-balancing two wheeled vehicle. When the first driving mechanism 110 isn't inserted into the body of the self-balancing two wheeled vehicle 10, the foot-controlled handle 120 is opened to the state as shown in FIG. 1, in which the operator can apply a driving force to the foot-controlled handle 120 by standing the pedals on both sides of the foot-controlled handle 120. Here, the corresponding second driving means is a leg driving means, that is, the operator applies a driving force to the steering shaft of the steering system by the two legs touching the foot-controlled handle 120 on both sides. When the second driving mechanism is operative, the foot-controlled handle 120 is opened from the packed state and fixed, and then can coaxially rotate with the steering shaft 20 by the driving base 121. The folding and fixing operation of the foot-controlled handle with respect to the driving base may be accomplished by conventional means. In the embodiments as shown in FIGS. 1 and 10, two terminals of the foot-controlled handle 120 can be pivotally connected to a driving base 121, the pivot axis OO' is perpendicular to the axis of the steering shaft PP'. Moreover, a stopper mechanism for stopping is provided between the driving base 121 and the foot-controlled handle, to fix the packing of the foot-controlled handle and work position. Hereby, the packing and opening of the foot-controlled handle 120 may be accomplished by the pivot rotating relative to the driving base, and a steering driving force may be applied to the steering shaft 20 by the operator's legs contacting the foot-controlled handle on the both sides.

Figure 4:
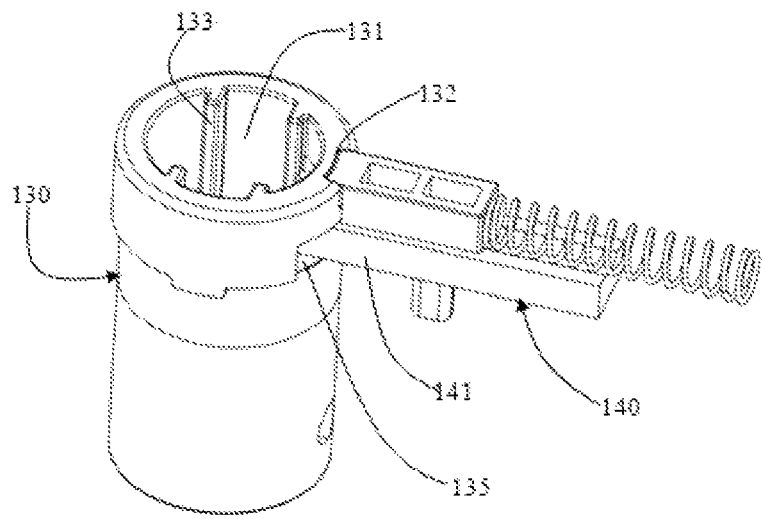
FIG. 4 is a stereogram view of partial components of the steering driving device of the invention, in which the driving base of the second driving mechanism and the steering shaft of the steering system are omitted.
Figure 8:
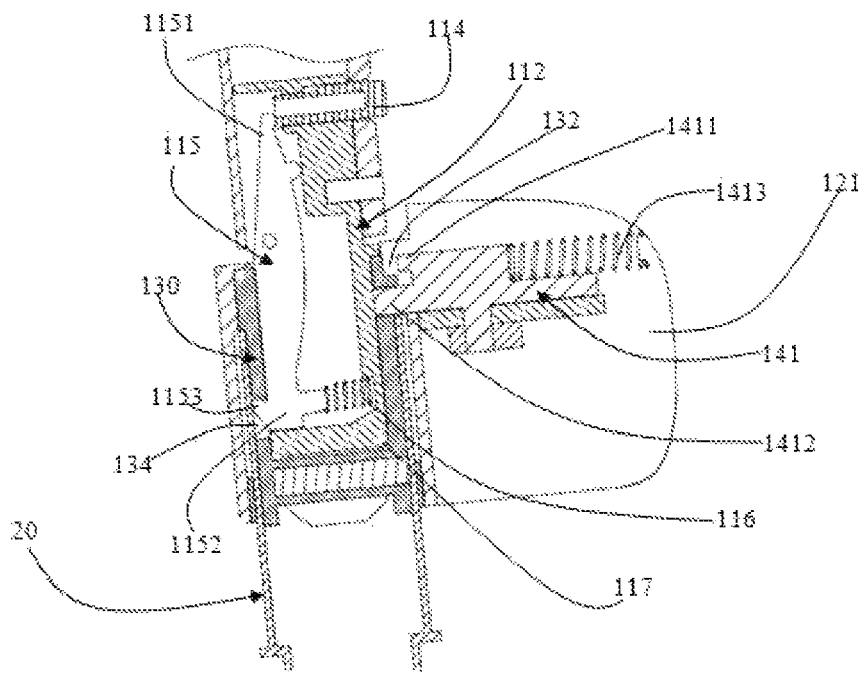
FIG. 8 is an exploded view of the actuating mechanism and transforming mechanism of the steering driving device of the invention.

In combination with FIG. 4 and reference to FIG. 8, the steering driving device 100 further comprises an actuating mechanism 130, which is fixedly connected to the steering shaft 20 of steering system (as shown in FIG. 8). When utilizing the first driving manner, the first driving mechanism 110 is coupled with the actuating mechanism 130, and provides a driving force for the steering shaft 20 by the actuating mechanism 130; and when utilizing the second driving manner, the second driving mechanism 120 is coupled, with the actuating mechanism 130, and provides a driving force for the steering shaft 20 by the actuating mechanism 130. In the embodiment, the actuating mechanism 130 is of a cylinder structure. In combination with FIG. 3, the first driving device 110 may be inserted into the actuating mechanism 130, and is fixedly connected to the actuating mechanism 130 at the circumference. That is, when the first driving device 110 rotates, the actuating mechanism 130 also rotates accordingly, so that the steering shaft 20 is driven to rotate, which will be described following in more details; when the first driving device 110 is coupled with the actuating mechanism 130, the second driving mechanism 120 will not be coupled with the actuating mechanism 130, that is, the second driving mechanism 120 loses the driving effect on the actuating mechanism 130. In another aspect, in combination with FIG. 1, when the first driving mechanism 110 isn't inserted into the vehicle body 10, the second driving mechanism 120 is coupled with the actuating mechanism 130, that is, the driving force applied to the second driving mechanism 120 (in the present embodiment, which is rotary torque produced by both the legs contacting the foot-controlled handle) may be transmitted to the actuating mechanism 130, and is further applied to the steering shaft 20 connected with the actuating mechanism 130.

In combination with FIGS. 1-5 and reference to FIG. 8, for the purpose of achieving the switch between the application of a driving force to the steering shaft 20 of the steering system by utilizing the first driving mechanism 110 and by the second driving mechanism 120, the steering driving mechanism of the invention further comprises a transforming mechanism 140 for canceling the coupling between the second driving mechanism 120 and the actuating mechanism 130 when the first driving mechanism 110 is coupled with the actuating mechanism 130, and for recovering the coupling between the second driving mechanism 120 and the actuating mechanism when the first driving mechanism 110 loses the coupling with the actuating mechanism 130.

More specifically, referring to FIGS. 3, 5, 6 and 7, the first driving mechanism 110 comprises an acting end 112 for being coupled with the actuating mechanism 130. As described above, referring to FIGS. 8 and 10, the second driving mechanism 120 comprises a driving base 121 for coaxially rotating with the actuating mechanism 130 when being coupled with the actuating mechanism 130. The second driving mechanism 120 provides a driving force to the steering shaft 20 by means of the driving base 121 and the actuating mechanism 130.

The actuating mechanism 130 comprises a housing groove 131 and a transforming hole 132. The housing groove 131 is provided with a fixing component 133 for interacting with the acting end 112 of the first driving mechanism 110 at the circumference, so that when the acting end 112 of the first driving mechanism 110 is inserted into the housing groove 131, the first driving mechanism 110 provides a driving force for the actuating mechanism 130 by means of the fixing effect of the fixing component 133.

The transforming mechanism 140 comprises a transforming pin 141. When the acting end 112 of the first driving mechanism 110 isn't inserted into the housing groove 131 of the actuating mechanism 130, the transforming pin 141 is inserted into the transforming hole 132 of the actuating mechanism 130, so that the second driving mechanism 120 is coupled with the actuating mechanism 130 by means of the driving base 121, while when the acting end 112 of the first driving mechanism 110 is inserted into the housing groove 131 of the actuating mechanism 130, the acting end 112 drives the transforming pin 141 to detach from the transforming hole 132, so that the coupling of the second driving mechanism 120 and the actuating mechanism 130 is cancelled.

Further, continuously combined with FIGS. 3-6, in the illustrated embodiments, multiple keyways 113 are provided at the acting end 112 of the first driving mechanism 110, and the fixing component of the housing groove 131 of the actuating mechanism 130 is a key-tooth 114 which is matched with the multiple keyways. Moreover, a chamfer 117 is further provided at the acting end 112 of the first driving mechanism 110 to drive the transforming pin 141 to detach from the transforming hole 132. It is readily understood that the fixed connection at the circumference can be also achieved in the housing groove 131 by the acting end 112 utilizing other means, for example, providing multiple key-teeth at the acting end, and setting the fixing component in the housing groove as keyways matched with the key-teeth.

Figure 7:
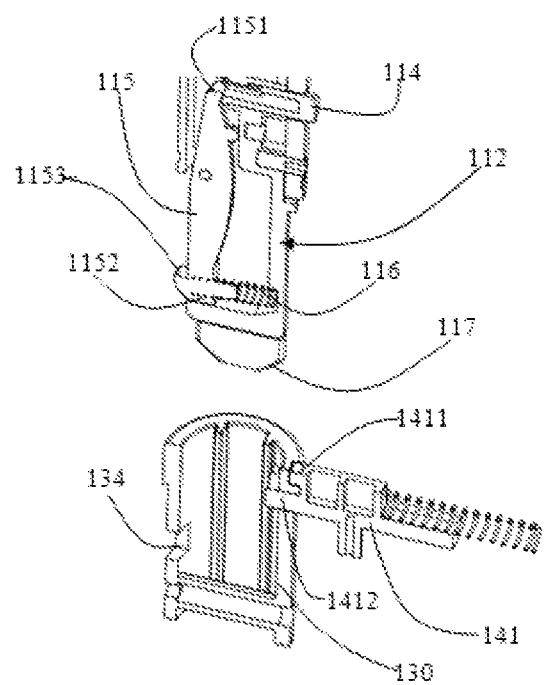
FIG. 7 is a stereogram view of partial components of the steering driving device in the separated state, in which a part of them are opened.

In combination with FIGS. 7 and 8, in order to further accomplish the first driving mechanism 110 and the actuating mechanism 130 being fixed in axial direction, the acting end 112 of the first driving mechanism 110 is provided with a mating assembly for engaging with the housing groove 131 of the actuating mechanism 130, and the housing groove 131 is accordingly provided with a mating hole 134 for engaging with the mating assembly. The mating assembly comprises a button 114, a buckle 115 and a buckle elastic component 116. The buckle 115 comprises a first buckle end 1151 and a second buckle end 1152, and the first buckle end 1151 contacts with the button 114, the second buckle end 1152 connects with the buckle elastic component 116, and is provided with a buckle projection 1153 for mating to the mating hole 134 of the housing groove 131 under the effect of the buckle elastic component 116.

When the first driving mechanism 110 is intended to be inserted into the actuating mechanism 130, press the button 114, and the buckle projection 1153 of the second buckle end 1152 is recovered under the effect of the button 114. At this time, the acting end 112 of the first driving mechanism 110 may be inserted into the groove of the actuating mechanism 130, and the acting end 112 pushes the transforming pin 141 out by means of the chamfer 117 upon inserting, so that the second driving mechanism 120 is discoupled with the actuating mechanism 130. Thereafter, the acting end 112 proceeds downward to the final position, the button 114 is released, the buckle projection 1153 match into the mating hole 134 under the effect of the buckle elastic component 116, the first driving mechanism 110 and the actuating mechanism 130 being fixed in the axial direction is achieved. In the illustrated embodiment, the buckle elastic component 116 consists of conventional springs.

Figure 5:
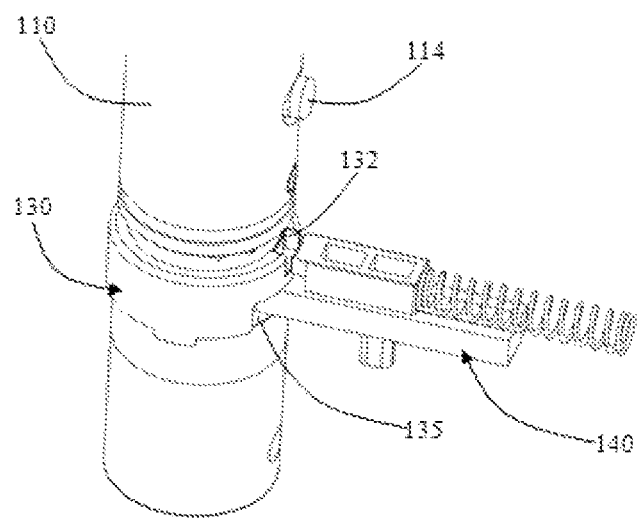
FIG. 5 is a stereogram view of partial components of the steering driving device of the invention when being inserted to the first driving mechanism.
Figure 6:
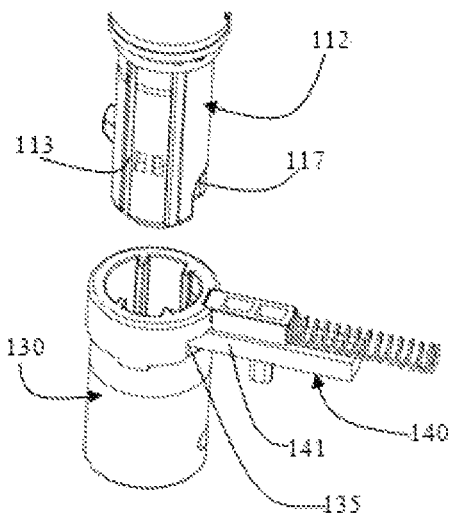
FIG. 6 is a stereogram view of partial components of the steering driving device in the separated state.

Referring to FIGS. 4, 5 and 7, the transforming pin 141 is provided with a transforming projection 1411 for inserting into the transforming hole 132. When the first driving mechanism 110 isn't inserted into the actuating mechanism 130, the transforming pin 141 is matched into the transforming hole 132 of the actuating mechanism 130 by means of the transforming projection 1411, so that the coupling between the second driving mechanism 120 and the actuating mechanism 130 is achieved, that is, the actuating mechanism 130 may rotate along with the rotation of the second driving mechanism 120, and increases a driving force to the steering shaft. Furthermore, in combination with FIG. 9, a Stereogram view embodying more details of the overturned state shown in FIG. 5, as shown in the figure, the transforming mechanism 140 may be provided with a support frame 143 fixed on the body of the self-balancing two wheeled vehicle, and the transforming pin 141 is fixedly provided with a sliding handle 1414 capable of sliding within the sliding groove 1431 of the support frame 143, achieving the switch function of the transforming pin 141. It is readily understood that the terminal of the transforming pin 141 may also be provided with an elastic component 1413 for providing an elastic force for the sliding action of the transforming pin 141.

In addition, referring to FIGS. 7 and 8, the transforming pin 141 is also provided with a stopper projection 1412. Correspondingly, referring to FIGS. 4, 5, 6 and 9, the actuating mechanism 130 is provided with a stopper rotating groove 135 for housing the stopper projection 1412, and the stopper rotating groove 135 is communicated with the housing groove 131. The second actuating mechanism 120 rotates in a certain angle range in rotating operation. For example, as shown in FIG. 1, the second actuating mechanism 120 is a foot-controlled handle, and when the operator contacts the handle on both sides with his legs, the rotation angle of the handle is only within about 20° on each side, and all of the steering requirements for the whole self-balancing two wheeled vehicle can be achieved by conventional arrangement of the steering control system. As a result, the arrangement of the stopper projection 1412 and the corresponding stopper rotating groove 135 may play the stopper role on the rotation of the second actuating mechanism 120. Additionally, when the second actuating mechanism 120 is opened and the whole vehicle is picked up, the stopper projection 1412 also plays the bearing role in the stopper rotating groove 135.

Figure 9:
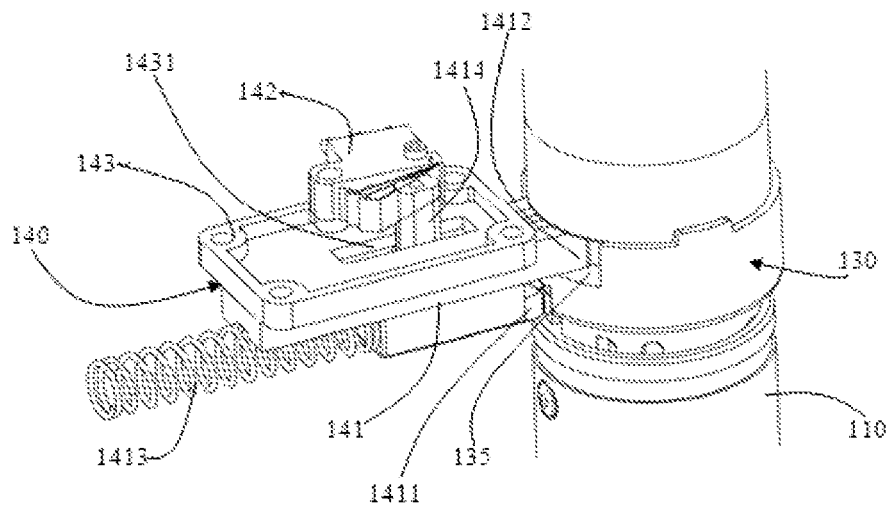
FIG. 9 is a stereogram view showing the details of the transforming mechanism of the invention.

As shown in FIG. 9, the transforming mechanism 140 is further provided with a sensitive switch 142 capable of being activated by the transforming pin 141. In the illustrated embodiment, when the steering pin 141 performs the steering action, the sensitive switch 142 is touched by the sliding handle 1414. The sensitive switch 142 is connected with the steering control system of the vehicle to send a switching signal for switching the manner to the steering control system. The steering angle changes of the vehicle caused by the angle changes of the steering shaft are different, and the steering directions are opposite, when the driving force is provided in two different driving manners. For example, when the driving force is provided by utilizing the first driving mechanism, that is, the driving force is provided by utilizing the hand-controlled handle of the present embodiment, the ratio between the rotation angle of the handle (i.e., the rotation angle of the steering shaft) and the rotation angle of the whole vehicle usually is greater than the ratio between the rotation angle of the steering shaft and the rotation angle of the vehicle when the driving force is provided by utilizing the second driving mechanism (the foot-controlled handle provided by the present embodiment). Therefore, as for different driving manners, the steering control system sets different control steering modes to finally control the steering sensitive of the vehicle body. The switch between the two modes is accomplished by turning on and off the sensitive switch 142. As the sensitive switch 142 is turned on and off, the sensitive switch will send, two different voltage change signals to the steering control system, and the control mode is switched, corresponding to the driving manner to precisely control the steering of the vehicle, when the steering control system receives the voltage change signals.

In summary, the steering driving device for a self-balancing two wheeled vehicle of the invention can provide a driving force for the steering system of a self-balancing two wheeled vehicle by utilizing two different driving manners, and can conveniently and reliably switch between the two driving manners, and at the same time, can ensure the small and compact volume of the self-balancing two wheeled, vehicle, so that the entertainment of the self-balancing two wheeled vehicle is enhanced, and an operator would have a good driving experience.

What is claimed is:

1. A steering driving device for a self-balancing two wheeled vehicle, for providing a steering system for the self-balancing two wheeled vehicle with a driving force, the driving force may be applied to a steering shaft of the steering system and drive the steering shaft to rotate, so that the self-balancing two wheeled vehicle performs a steering action, wherein the steering driving device comprising:
  a first driving mechanism for providing a driving force for the steering system of the self-balancing two wheeled vehicle by utilizing a first driving manner;
  a second driving mechanism for providing a driving force for the steering system of the self-balancing two wheeled vehicle by utilizing a second driving manner;
  an actuating mechanism, which is fixedly connected to the steering shaft of the steering system, when the first driving manner is utilized, the first driving mechanism is coupled with the actuating mechanism, and provides a driving force for the steering shaft by means of the actuating mechanism, and when the second driving manner is utilized, the second driving mechanism is coupled with the actuating mechanism, and provides a driving force for the steering shaft by means of the actuating mechanism; and
  a transforming mechanism for canceling the coupling of the second driving mechanism and the actuating mechanism when the first driving mechanism is coupled to the actuating mechanism, and for recovering the coupling of the second driving mechanism and the actuating mechanism when the first driving mechanism is discoupled to the actuating mechanism.

2. The steering driving device for a self-balancing two wheeled vehicle according to claim 1, wherein the first driving mechanism comprises an acting end for coupling with the actuating mechanism;

the second driving mechanism comprises a driving base which will coaxially rotate with the actuating mechanism when coupled with the actuating mechanism, and the second driving mechanism provides a driving force for the steering shaft by means of the driving base and the actuating mechanism;

the actuating mechanism comprises a housing groove and a transforming hole, the housing groove is provided with a fixing component interacting with the acting end of the first driving mechanism at the circumference, for the first driving mechanism to provide a driving force for the actuating mechanism through the fixing effect of the fixing component when the acting end is inserted into the housing groove;

the transforming mechanism comprises a transforming pin, when the acting end of the first driving mechanism isn't inserted into the housing groove of the actuating mechanism, the transforming pin is inserted into the transforming hole of the actuating mechanism, so that the second driving mechanism is coupled with the actuating mechanism via the driving base, when the acting end of the first driving mechanism is inserted into the housing groove of the actuating mechanism, the acting end drives the transforming pin to detach from the transforming hole, so that the second driving mechanism is discoupled with the actuating mechanism.

3. The steering driving device, for a self-balancing two wheeled vehicle according to claim 2, wherein multiple keyways are provided at the acting end of the first driving mechanism, and the fixing component of the housing groove is a key-tooth matched with the multiple keyways, and a chamfering is further provided at the acting end to drive the transforming pin to detach from the transforming hole.

4. The steering driving device for a self-balancing two wheeled vehicle according to claim 3, wherein the acting end is provided with a mating assembly for engaging with the housing groove, and the housing groove is provided with a mating hole for engaging with the mating assembly, the mating assembly comprises a button, a buckle and a buckle elastic component, the buckle comprises a first buckle end and a second buckle end, and the first buckle end contacts with the button, the second buckle end connects with the buckle elastic component, and is provided with a buckle projection for mating with the mating hole under the effect of the buckle elastic component.

5. The steering driving device for a self-balancing two wheeled vehicle according to claim 2, wherein the transforming pin is provided with a transforming projection for being inserted into the transforming hole.

6. The steering driving device for a self-balancing two wheeled vehicle according to claim 5, wherein the transforming pin is also provided with a stopper projection, and the actuating mechanism is provided with a stopper rotating groove for housing the stopper projection, and the stopper rotating groove is communicated with the housing groove.

7. The steering driving device for a self-balancing two wheeled vehicle according to claim 6, wherein the transforming mechanism is also provided with a sensitive switch capable of being activated by the transforming pin.

8. The steering driving device for a self-balancing two wheeled vehicle according to claim 1, wherein the first driving mechanism is a manual-controlled handle, the first driving manner is a manual-driven manner, and the second driving mechanism is a foot-controlled handle, and the second driving manner is a leg-driven manner.

9. The steering driving device for a self-balancing two wheeled vehicle according to claim 2, wherein the first driving mechanism is a manual-controlled handle, the first driving manner is a manual-driven manner, and the second driving mechanism is a foot-controlled handle, and the second driving manner is a leg-driven manner.

10. The steering driving device for a self-balancing two wheeled vehicle according to claim 3, wherein the first driving mechanism is a manual-controlled handle, the first driving manner is a manual-driven manner, and the second driving mechanism is a foot-controlled handle, and the second driving manner is a leg-driven manner.

11. The steering driving device for a self-balancing two wheeled vehicle according to claim 4, wherein the first driving mechanism is a manual-controlled handle, the first driving manner is a manual-driven manner, and the second driving mechanism is a foot-controlled handle, and the second driving manner is a leg-driven manner.

12. The steering driving device tor a self-balancing two wheeled vehicle according to claim 5, wherein the first driving mechanism is a manual-controlled handle, the first driving manner is a manual-driven manner, and the second driving mechanism is a foot-controlled handle, and the second driving manner is a leg-driven manner.

13. The steering driving device for a self balancing two wheeled vehicle according to claim 6, wherein the first driving mechanism is a manual-controlled handle, the first driving manner is a manual-driven manner, and the second driving mechanism is a foot-controlled handle, and the second driving manner is a leg-driven manner.

14. The steering driving device for a self-balancing two wheeled vehicle according to claim 7, wherein the first driving mechanism is a manual-controlled handle, the first driving manner is a manual-driven manner, and the second driving mechanism is a foot-controlled handle, and the second driving manner is a leg-driven manner.

* * * * *